INVENTOR.
RICHARD R. SECUNDE &
BY ALOYSIUS W. PRATT
Bosworth, Sessions, Herstrom
& Knowles
ATTORNEYS

United States Patent Office 3,075,127
Patented Jan. 22, 1963

3,075,127
ALTERNATING CURRENT FREQUENCY SENSING AND INDICATING CIRCUIT
Richard R. Secunde, Cleveland, and Aloysius W. Pratt, New Carlisle, Ohio, assignors, by mesne assignments, to Lear Siegler, Inc., a corporation of Delaware
Filed Sept. 26, 1960, Ser. No. 58,293
10 Claims. (Cl. 317—147)

This invention relates to a static frequency sensing and frequency indicating circuit for use with alternating current systems and particularly to such a circuit in which the volt-second capacity of a saturable reactor is utilized to establish a time reference.

In an alternating current power system, it is often necessary and desirable to protect the utilization equipment and the system in general from the effects of an off-frequency condition. Such a condition may develop, for example, as a result of loss of frequency control. Low frequency may indicate a faulty drive which should be disconnected in order to prevent further damage. It is, therefore, important that such off-frequency conditions be detected and proper protective action taken. A device which senses frequency can also be used as a part of an automatic start-up shut-down apparatus in an alternating current power system. A frequency sensing circuit can be used in such an application to insure that the load is connected to the alternator only when the alternator output frequency lies within a specified range.

It is an object of our invention to provide a circuit adapted to sense system frequency and indicate when the sensed system frequency falls below or rises above a pre-determined level; i.e., when an off-frequency condition exists. Another object is to provide such a frequency sensing and indicating circuit which monitors system frequency once during each cycle of system frequency so the the time delay between the occurrence of an off-frequency condition and the indication of that condition is very short. A further object of our invention is to provide a time reference of high accuracy that is relatively independent of variations in temperature and in system voltage. Another object is to provide an off-frequency protection circuit which draws all necessary power from the system being monitored and, therefore, needs no additional power supply circuitry. Still another object is to provide an off-frequency protection circuit having a relay contact output capable of providing a definite and useable fault signal which can operate other control equipment without additional circuitry. Yet another object is to provide a frequency protection circuit which, with the exception of the output relay, is comprised of small, lightweight, static components.

Figure 1:
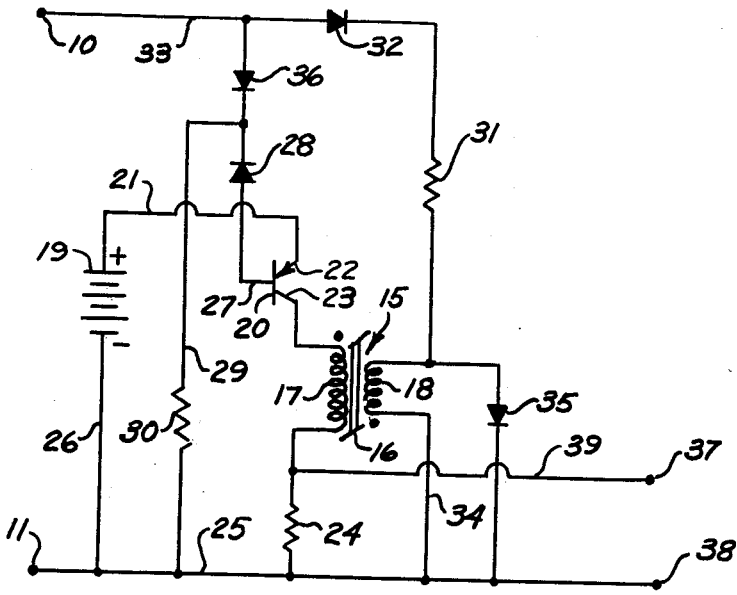
Figure 2:
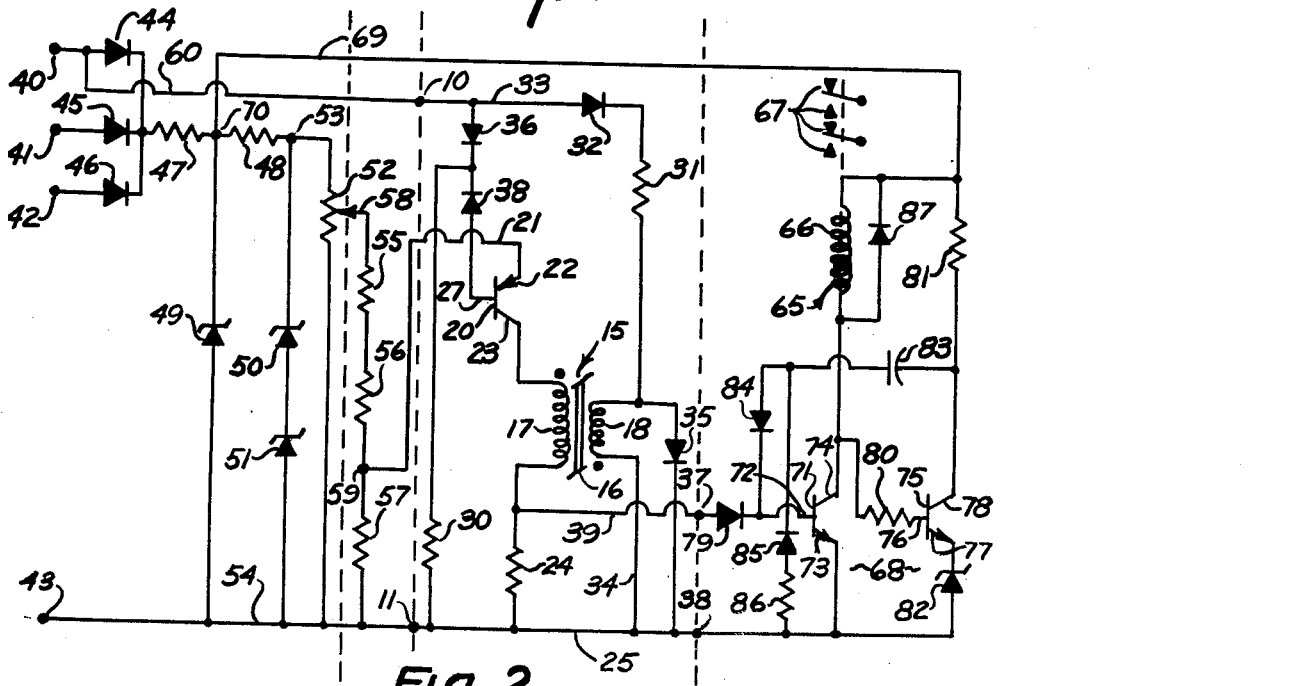

Other objects and advantages of our invention will appear from the following description, reference being had to the accompanying drawings in which:

FIGURE 1 is a diagram of a single-phase frequency sensing and off-frequency indicating circuit embodying our invention; and FIGURE 2 is a diagram of a polyphase form of frequency sensing and off-frequency indicating circuit embodying our invention arranged to provide a relay contact output.

Briefly, the circuit of our invention functions to monitor continuously the frequency of an alternating current power system by comparing, once during each cycle of system frequency, half periods of that frequency with a time reference. The time reference is based upon the volt-second capacity of a saturable reactor having a core of square hysteresis loop material. It is well known that the flux level of a saturable core of square loop material having a winding thereon can be changed by an amount proportional to the volt-seconds applied to the winding. Therefore, if a fixed voltage is applied to the winding of a saturable reactor when its core is in a known magnetic condition for a length of time proportional to a frequency to be monitored, the change in flux level of the core will be proportional to the monitored frequency. For convenience in reading and indicating this change in core flux level, the magnitude of the magneto-motive forces may be so selected with respect to the properties of the core that the core will be driven from one condition of saturation to the opposite condition of saturation when the frequency of the monitored system is at a predetermined level.

The foregoing principle of operation of our invention is illustrated in connection with the single-phase circuit of FIGURE 1. In this circuit, the alternating current to be frequency-monitored is applied to input terminals 10 and 11. For convenience in the following description, the input voltage applied to terminals 10 and 11 is broken down into positive and negative half-cycles. That half-cycle during which input terminal 10 is more positive than input terminal 11 is characterized as the "positive" half-cycle and that half-cycle during which input terminal 11 is more positive than input terminal 10 is characterized as the "negative" half-cycle.

Saturable reactor 15 having a core 16, a sensing winding 17 and a resetting winding 18 comprises the time reference portion of the circuit. A fixed voltage represented by battery 19 is applied through conductor 21 to the emitter 22 of a PNP transistor switch 20. This voltage is very small as compared to the voltage to be monitored. One end of sensing winding 17 is connected to the collector 23 of the transistor switch 20 and the other end to the negative terminal of battery 19 through output impedance 24 and conductors 25 and 26. It will be seen that the portion of the circuit described above comprises a fixed source of potential connected to a winding of a saturable reactor through a transistor switch.

Transistor switch 20 is controlled in accordance with system frequency through its base 27 which is connected to input terminal 11 through a unidirectional impedance or diode rectifier 28, a conductor 29, a current limiting resistor 30 and a conductor 25. Diode rectifier 28 is poled to permit transistor switch 20 to saturate or turn on during negative half-cycles of monitored system voltage and thus permit D.C. potential to flow from battery 19 through the emitter-collector circuit, sensing winding 17 and load impedance 24 during every other half-cycle of system frequency.

Saturatable reactor 15 is reset once each cycle by re-setting winding 18. One end of winding 18 is connected to input terminal 10 through a current limiting resistor 31, a unidirectional impedance or diode rectifier 32 and conductor 33, and its other end is connected to input terminal 11 through conductors 34 and 25. Diode rectifier 32 is poled to permit positive half-cycles of monitored system voltage to be applied to resetting winding 18 in order to reset core 16 to a saturated condition once each cycle of system frequency. A low voltage reference diode 35 is connected in parallel with resetting winding 18 and arranged to conduct positive half-cycles and block negative half-cycles of monitored system voltage. Diode 35 and resistor 31 limit the voltage applied to resetting winding 18. Resetting is accomplished rapidly by means of relatively few turns and so that high voltage peaks will not be induced in sensing winding 17 during resetting.

An additional path for positive half-cycles of system voltage is provided by a unidirectional impedance or diode rectifier 36 interconnecting current limiting resistor 30 and a point on conductor 33 between input terminal 10 and diode rectifier 28. Diode rectifier 36 thus provides a blocking signal to diode rectifier 28 during positive half-cycles of system voltage to maintain transistor switch 20 turned off during such half-cycles.

The underfrequency indicating output signal appears at output terminals 37 and 38, connected by conductors 39 and 25, respectively, to the ends of output impedance 24.

The circuit operates in the following manner to provide output signals at output terminals 37 and 38 indicative of the relationship between the frequency of the monitored system voltage applied to input terminals 10 and 11 and a predetermined frequency. During positive half-cycles of input voltage, diode rectifier 32 conducts and voltage is applied to resetting winding 18, driving core 16 of saturable reactor 15 to negative saturation. The voltage applied to resetting winding 18 is limited by resistor 31 and low voltage reference diode 35 so that resetting can be accomplished rapidly through the use of comparatively few turns in resetting winding 18. These means also limit the voltage pulses induced in sensing winding 17 during resetting to a value that will not cause damage to transistor 20. Also during positive half-cycles of system voltage, diode rectifier 36 conducts through resistor 30 and applies inverse voltage to diode rectifier 28 so that it will block the flow of base current in transistor 20. During positive half-cycles of system voltage, therefore, transistor 20 is turned off and no voltage is applied to sensing winding 17 of reactor 15.

During negative half-cycles of system voltage, diode rectifiers 32, 35 and 36 all block. Diode rectifier 28 is unblocked and conducts, and base current flows in transistor 20 from the positive terminal of battery 19 through emitter 22, base 27, diode rectifier 28 and resistor 30. As a result of the base current, transistor 20 is turned on and a voltage approximately equal to that of battery 19 is applied to sensing winding 17 and output impedance 24, the voltage drop across transistor 20 being very low because of its low saturation resistance. This voltage produces a magnetizing current in sensing winding 17 tending to drive the flux level of core 16 from negative saturation (its reset condition) toward positive saturation. Resistor 24 is of low ohmic value relative to the impedance of sensing winding 17 when core 16 is in an unsaturated condition and, therefore, the voltage developed across output impedance 24 by the magnetizing current flowing in the sensing winding 17 is relatively very low when it is unsaturated.

As will be seen from the foregoing description, transistor 20 is operated in a switching mode, turning on when the potential of input terminal 10 drops below the positive potential of battery 19 and turning off when it rises above that voltage. Since the voltage at the positive terminal of battery 19 is very small compared to the system voltage applied to the input terminals, it can be assumed that transistor 20 is turned on as the monitored system voltage passes zero as it goes from positive to negative and turns off when it passes through zero as it goes from negative to positive. Thus, once during each cycle of input frequency, transistor 20 is turned on for one half period of input frequency, during which time a fixed voltage is applied to sensing winding 17 changing the flux level of saturable reactor 15 by an amount proportional to input frequency. Transistor 20 is turned off once each cycle for the other half period of input frequency, during which time no voltage is applied to sensing winding 17 while resetting winding 18 is returning the flux level of core 16 to a condition of saturation.

When the frequency of the monitored alternating current system is above a predetermined or trip value, the frequency-proportional time interval that transistor 20 is turned on and conducting battery voltage to sensing winding 17 is not long enough to change the flux level of core 16 from negative to positive saturation. Therefore, during negative half-cycles of input voltage, the voltage across output impedance 24 and at output terminals 37 and 38 are pulses of low amplitude and of one-half period duration of monitored frequency and constitute a characteristic output signal indicating that the frequency in the monitored system is above the trip level.

When the frequency of the monitored system is below the trip value, however, the negative half-cycles are of such duration that transistor 20 remains on and conducts battery voltage to sensing winding 17 long enough to change the flux level of saturable reactor 15 from negative to positive saturation during each half-cycle. Under this condition, voltage peaks of comparatively large amplitude appear across output impedance 24 and at output terminals 37 and 38 at the end of negative half-cycles as a result of the large current which flows in sensing winding 17 each time core 16 reaches positive saturation. These voltage peaks are substantially greater than the pulses appearing across output impedance 24 as a result of magnetizing current therethrough and constitute a characteristic output signal indicating that the frequency in the monitored system is below the trip level. Because of limitations imposed by the hysteresis loop characteristic of magnetic cores presently available, these characteristic under-frequency output pulses do not occur instantaneously, but rise gradually over a range of monitored system frequency. The rate of voltage peak build-up can be made great enough, however, to provide a characteristic output signal sufficient to consistently trip a proper output circuit at the same frequency plus or minus one cycle per second.

From the foregoing, it is apparent that the circuit of our invention may be used to monitor the frequency of an alternating current system and to provide indications of a frequency condition in the system either above or below a predetermined value. By combining several of these circuits having different trip levels, bands of operating frequency can be indicated and used to provide control functions for the system.

FIGURE 2 shows the circuit of our invention adapted to monitor the frequency of a four-wire, three-phase alternating current power system while deriving all necessary power for its operation from the monitored system. The circuit shown in FIGURE 2 also includes a suitable output signal amplifier and relay contact output circuit responsive to characteristic underfrequency output signals.

As indicated by the vertical broken lines, the circuit is functionally divided into four sections; i.e., a regulated power supply and adjustment section, a temperature compensating section, a cyclic frequency sensing and resetting section, and a monostable pulse amplifier and relay section.

The regulated power supply and adjustment section comprises three phase input terminals 40, 41 and 42 and a neutral input terminal 43 for connection of the device to a four-wire, three phase alternating current power system. Diode rectifiers 44, 45 and 46 connected to phase input terminals 40, 41 and 42, respectively, have their cathodes connected together to provide half-wave rectified three-phase power to a two-stage voltage regulator comprising resistors 47 and 48 and voltage reference or Zener diodes 49, 50 and 51 arranged as shown. A potentiometer 52 is connected between the output terminal 53 of the two-stage voltage regulator and neutral conductor 54 to provide for adjustment of the voltage output of this section. The regulated power supply and adjustment section provides the close voltage regulation necessary to maintain the accuracy of trip frequency over a wide range of monitored power system phase voltages. For example, in a 115 volt, 400 c.p.s. system, such a regulated power supply section as described above can maintain the accuracy of the trip frequency within a ±5 c.p.s. tolerance throughout a phase-to-neutral voltage range of 80 to 130 volts.

The temperature compensation section comprises a serial combination of positive temperature coefficient resistor 55 and low temperature coefficient resistors 56 and 57, all connected between the movable contact 58 of potentiometer 52 and neutral conductor 54. The output of this section appears at terminal 59 in the resistance network between resistors 56 and 57. Such a temperature compensation section can be made to hold the output voltage of the voltage regulator section within the tolerances stated in connection therewith over a temperature range of −55° C. to 120° C.

The cyclic frequency sensing and resetting section comprising the next portion of the circuit shown in FIGURE 2 is similar to the circuit shown in FIGURE 1 and the same reference numerals have been applied to like components. Input terminal 10 is supplied with a system frequency signal from only one phase of the monitored system by means of conductor 60 connecting it to input terminal 40 ahead of diode rectifier 44. All three phases, however, are utilized to provide sufficient regulated and compensated power to the circuit. The cyclic frequency sensing and resetting portion of the circuit in FIGURE 2 differs from that shown in FIGURE 1 in that the fixed potential power supply is obtained from the system whose frequency is being monitored rather than from battery 19. Therefore, conductor 21 from emitter 22 of transistor 20 is connected to output terminal 59 of the temperature compensating section of the circuit in FIGURE 2. The operation of the circuit is as described in connection with FIGURE 1, the characteristic voltage peaks appearing across resistor 24 in the event that the frequency of the system falls below the predetermined value.

The monostable pulse amplifier and relay section of the circuit in FIGURE 2 senses the presence of the larger voltage peaks which appear across impedance 24 when an underfrequency condition exists and extends their duration and amplifies them enough to operate a relay. This section includes an output relay 65 having a winding 66 and output contacts 67 and a "flip-flop" circuit indicated generally by reference numeral 68. Direct current is supplied to the output section by conductor 69 connected to terminal 70 in the power supply section of the circuit for energizing relay 65 and for the functioning of the "flip-flop" circuit. The "flip-flop" circuit comprises an NPN transistor 71 having a base 72, an emitter 73 and a collector 74 and an NPN transistor 75 having a base 76, an emitter 77 and a collector 78. Base 72 of transistor 71 is connected through diode rectifier 79 to output terminal 37 of the cyclic frequency sensing and resetting section. Collector 74 of transistor 71 is connected to relay winding 66 and the emitter 73 is connected to output terminal 38 of the sensing and resetting section. Transistor 71 operates as a switch, permitting or preventing the flow of direct current through relay winding 66 in accordance with output signals from the sensing and resetting circuit applied to its base 72. The base 76 of transistor 75 is connected to collector 74 of transistor 71 through a current limiting resistor 80. Collector 78 is connected through resistor 81 directly to direct current supply conductor 69. The emitter 77 is connected to the cathode of a voltage reference diode 82 having its anode connected to system neutral. Collector 78 of transistor 75 and base 72 of transistor 71 are interconnected by a series combination comprising a condenser 83 and a diode rectifier 84 poled to pass current from collector 78 to base 72. A point in the series condenser 83-diode 84 combination is connected to the cathode of diode rectifier 85, the anode of which is connected through resistor 86 to system neutral. A diode rectifier 87 is connected in parallel with relay winding 66 and is poled so that conductor 69 supplies inverse voltage to it.

This pulse amplifier and relay circuit operates in the following manner: When the frequency being monitored is above a predetermined value or trip level, relatively low amplitude pulses are supplied by the cyclic frequency sensing and resetting section to the base 72 of transistor 71 through output terminal 37. The bias on transistor 71 is sufficiently high that these pulses do no cause transistor 71 to saturate and turn on. During such a condition of operation, transistor 75 is saturated or turned on by base current flowing through the coil 66 of relay 65 and base current limiting resistor 80. This current is insufficient to energize or pick up relay 65 and, therefore, the relay remains de-energized when system frequency is above trip level.

When the system frequency being monitored is below trip level, the characteristic larger output voltage peaks appearing at output terminal 37 of the cyclic frequency sensing and resetting section are applied to base 72 of transistor 71 and are sufficient to overcome the bias made up of the forward voltage drops of diode 79 and the base-emitter junction of transistor 71. Thus, transistor 71 is saturated during the latter part of those half periods of system frequency that are below trip level. When transistor 71 is turned on, direct current voltage from the first stage of regulation in the power supply section of the circuit is applied through conductor 69 to relay winding 66 and permitted to flow to neutral conductor 54 through the collector-emitter circuit of transistor 71. Transistor 75 then turns off because its base voltage becomes less than the break-down voltage of Zener diode 82. As a result, the voltage on collector 78 of transistor 75 tends to rise and charge capacitor 83 through resistance 81. The charging current also flows through diode 84 and into base 72 of transistor 71 maintaining transistor 71 "on" and transistor 75 "off" even though the original saturating pulse applied to base 72 of transistor 71 has disappeared. When the charging current of capacitor 83 decays below the value necessary to maintain transistor 71 saturated, transistor 71 will turn off and transistor 75 will again turn on. When transistor 75 turns on, capacitor 83 discharges rapidly through the collector-emitter circuit of transistor 75 resetting the output section to a condition in which it is ready to function when the next large voltage pulse is applied to base 72 of transistor 71.

Diode rectifiers 79, 84 and 85 are used for blocking functions during the modes of "flip-flop" operation of the output section. Diode rectifier 87, connected in parallel with winding 66 of relay 65, functions in a "free-wheeling" manner to protect transistors 71 and 75 from inductive voltage peaks produced when winding 66 of relay 65 is supplied with pulses of direct voltage.

The monostable circuit of the output section is designed so that the voltage peaks which appear across output impedance 24 when the monitored frequency is below level are large enough to turn on transistor 71 and each of such peaks will cause the output circuit to apply a direct voltage to the coil 66 of relay 65 for approximately one-half period of monitored system frequency and of a magnitude large enough to cause the relay to be energized. When the monitored frequency rises above trip level, transistor 71 turns off reducing the magnitude of the current through coil 66 enough to cause relay 65 to be de-energized. Transistor 75 remains on and the "flip-flop" circuit is thus reset for operation upon the next occurrence of an underfrequency condition in the monitored system.

It will thus be apparent that we have provided a frequency sensing and off-frequency indicating circuit for monitoring frequency in an alternating current system capable of supplying a first characteristic output signal when the monitored frequency is above a predetermined level and a second characteristic output signal when the monitored system frequency is below a predetermined level. Further, our invention embodies a time reference of high accuracy and power supply and regulation means for supplying the circuit from the monitored system in a manner that maintains the high accuracy independently of variations in temperature and/or system voltage.

Those skilled in the art will appreciate that various changes and modifications can be made in the apparatus described herein without departing from the spirit and scope of the invention.

We claim:

1. A frequency sensing and indicating circuit for an alternating current system comprising a saturable core, sensing means responsive to the frequency of said alternating current system for changing the flux level in said core in one direction an amount proportional to the frequency of said system and substantially independent of variations in the voltage of said system, resetting means for changing the flux level in said core in the other direction to a predetermined level, said sensing means and said resetting means alternately and successively acting on said core and output means for providing a characteristic output signal when the flux level of said core is changed a predetermined amount from said predetermined reset level by said sensing means.

2. A frequency sensing and indicating circuit for an alternating current system comprising a saturable core, sensing means responsive to the frequency of said alternating current system for changing the flux level in said core in one direction an amount proportional to the frequency of said system and substantially independent of variations in the voltage of said system, resetting means for changing the flux level of said core in the other direction to a condition of saturation in said other direction, said sensing means and said resetting means alternately and successively acting on said core once during each cycle of the frequency of said system and output means for providing a characteristic output signal when the flux level of said core is changed to a condition of saturation by said sensing means.

3. A frequency sensing and indicating circuit for an alternating current system comprising rectifying means in circuit with said system for providing a source of unidirectional potential, a saturable core for providing a single flux path, a first winding on said core linking said flux path for changing the flux level in said core in one direction, switch means interconnecting said rectifying means and said first winding, circuit means connecting said switch means to said alternating current system for rendering said switch means alternately conducting and non-conducting for successive half periods of system frequency, a second winding on said core linking said flux path for changing the flux level in said core in the opposite direction, unidirectional circuit means connecting said second winding to said alternating current system for supplying magnetizing current to said second winding to reset the flux level of said core to a predetermined level during the time interval when said switch means is non-conducting, output means in circuit with said first winding for providing a characteristic output signal when the flux level of said core is changed a predetermined amount from the reset level by said first winding.

4. A frequency sensing and indicating circuit for an alternating current system comprising a source of unidirectional potential, a saturable core for providing a single flux path, a first winding on said core linking said flux path, means in circuit with said first winding and said source of unidirectional potential adapted to supply said first winding with voltage pulses having a constant amplitude and a width proportional to the frequency of said alternating current system and of a polarity tending to change the flux level in said core in one direction, a second winding on said core linking said flux path, means in circuit with and adapted to supply said second winding with voltage pulses in alternation with the voltage pulses supplied to said first winding and of a polarity and average value tending to change the flux level in said core in the opposite direction to a predetermined level, output means in circuit with said first winding adapted to provide a characteristic output signal when the flux level of said core is changed a predetermined amount by said voltage pulses supplied to said first winding.

5. A frequency sensing and indicating circuit for an alternating current system comprising a regulated source of unidirectional potential substantially independent of variations in the voltage of said system, a saturable core for providing a single flux path, a first winding on said core linking said flux path, means responsive to the frequency of said system in circuit with said first winding and said source of unidirectional potential adapted to connect said source of unidirectional potential to said first winding during one half period of frequency of said system so that magnetizing current flows through said first winding in a direction tending to change the flux level in said core in one direction, a second winding on said core linking said flux path, rectifier means connected to said system and said second winding adapted to supply said second winding during the other half period of system frequency so that current flows through said second winding tending to change the flux level in said core to a condition of saturation in the opposite direction, output means in circuit with said first winding adapted to provide a characteristic output signal when the flux level of said core is driven into saturation by the magnetizing current flowing in said first winding.

6. A frequency sensing and indicating circuit for an alternating current system comprising a source of unidirectional potential, an input circuit including a pair of input terminals connected to said system, a saturable core providing a flux path, first and second windings on said core linking said flux path, a transistor switch having a base, an emitter and a collector, rectifier means and output impedance means, means connecting said first winding and said source of unidirectional potential to the emitter-collector circuit of said transistor switch, means connecting said base of said transistor switch to one of said input terminals so that said transistor switch conducts during one half period of system frequency, means connecting said second winding and said rectifier means in series between said input terminals, said rectifier means arranged to conduct during the other half period of system frequency, means associated with said second winding to limit the amplitude of the voltage applied thereto to a predetermined level, an output circuit including a pair of output terminals each connected to one end of said output impedance means.

7. A frequency sensing and indicating circuit for an alternating current system comprising a saturable core, sensing means responsive to the frequency of said alternating current system for changing the flux level in said core in one direction an amount proportional to the frequency of said system, resetting means for changing the flux level in said core in the other direction to a predetermined level, said sensing means and said resetting means alternately and successively acting on said core and output means for providing a characteristic output signal when the flux level of said core is changed a predetermined amount from said predetermined reset level by said sensing means, in combination with a monostable pulse amplifier and relay control circuit comprising an output relay energizable in response to the occurrence of said characteristic output signal and means responsive to said characteristic output signal for maintaining said relay energized for a predetermined period of time after the occurrence of said characteristic output signal.

8. A frequency sensing and indicating circuit for an alternating current system comprising a saturable core, sensing means responsive to the frequency of said alternating current system for changing the flux level in said core in one direction an amount proportional to the frequency of said system, resetting means for changing the flux level in said core in the other direction to a predetermined level, said sensing means and said resetting means alternately and successively acting on said core and output means for providing a characteristic output signal when the flux level of said core is changed a predetermined amount from said predetermined reset level by said sensing means, in combination with a pulse amplifier and relay control circuit comprising the source of unidirectional potential, an output relay having a winding and a first switch means interconnecting said source and said winding, said switch means also being in circuit with and responsive to the characteristic output signal provided by said output means of said frequency sensing and indicating circuit so that said first switch means is turned on energizing said winding of the control relay from said source when a characteristic output signal appears across said output means a second switch means responsive to the conducting condition of said first switch means and capacitance means in circuit with said second switch means, said first switch means and said source so that when said first switch means is turned on said second switch means is turned off in response thereto and said capacitance is charged from said source to a predetermined potential sufficient to maintain said first switch means turned on for a period of time proportional to the impedance of said capacitance.

9. A frequency sensing and indicating circuit for an alternating current system comprising a source of unidirectional potential, an input circuit including a pair of input terminals connected to said system, a saturable core providing a flux path, first and second windings on said core linking said flux path, a transistor switch having a base, an emitter and a collector, rectifier means and output impedance means, means connecting said first winding and said source of unidirectional potential to the emitter-collector circuit of said transistor switch, means connecting said base of said transistor switch to one of said input terminals so that said transistor switch conducts during one half period of system frequency, means connecting said second winding and said rectifier means in series between said input terminals, said rectifier means arranged to conduct during the other half period of system frequency, means associated with said second winding to limit the amplitude of the voltage applied thereto to a predetermined level, an output circuit including a pair of output terminals each connected to one end of said output impedance means in combination with a monostable pulse amplifier and relay control circuit comprising an output relay energizable in response to the occurrence of said characteristic output signal and means responsive to said characteristic output signal for maintaining said relay energized for a predetermined period of time after the occurrence of said characteristic output signal.

10. A frequency sensing and indicating circuit for an alternating current system comprising a source of unidirectional potential, an input circuit including a pair of input terminals connected to said system, a saturable core providing a flux path, first and second windings on said core linking said flux path, a transistor switch having a base, an emitter and a collector, rectifier means and output impedance means, means connecting said first winding and said source of unidirectional potential to the emitter-collector circuit of said transistor switch, means connecting said base of said transistor switch to one of said input terminals so that said transistor switch conducts during one half period of system frequency, means connecting said second winding and said rectifier means in series between said input terminals, said rectifier means arranged to conduct during the other half period of system frequency, means associated with said second winding to limit the amplitude of the voltage applied thereto to a predetermined level, an output circuit including a pair of output terminals each connected to one end of said output impedance means in combination with a pulse amplifier and relay control circuit comprising the source of unidirectional potential, an output relay having a winding and a first switch means interconnecting said source and said winding, said switch means also being in circuit with and responsive to the characteristic output signal provided by said output means of said frequency sensing and indicating circuit so that said first switch means is turned on energizing said winding of the control relay from said source when a characteristic output signal appears across said output means, a second switch means responsive to the conducting condition of said first switch means and capacitance means in circuit with said second switch means, said first switch means and said source so that when said first switch means is turned on said second switch means is turned off in response thereto and said capacitance is charged from said source to a predetermined potential sufficient to maintain said first switch means turned on for a period of time proportional to the impedance of said capacitance.

References Cited in the file of this patent
UNITED STATES PATENTS

| | | |
|---|---|---|
| 2,757,320 | Schuh | July 31, 1956 |
| 2,772,396 | Buie | Nov. 27, 1956 |
| 2,994,831 | Schohan | Aug. 1, 1961 |

UNITED STATES PATENT OFFICE
CERTIFICATE OF CORRECTION

Patent No. 3,075,127                                      January 22, 1963

Richard R. Secunde et al.

It is hereby certified that error appears in the above numbered patent requiring correction and that the said Letters Patent should read as corrected below.

Column 6, line 45, before "level" insert -- trip --.

Signed and sealed this 22nd day of October 1963.

(SEAL)
Attest:

ERNEST W. SWIDER                                EDWIN L. REYNOLDS
Attesting Officer                                    Acting Commissioner of Patents